Feb. 1, 1938.  J. M. MITCHELL  2,107,080
ANIMAL TRAP
Filed June 4, 1935
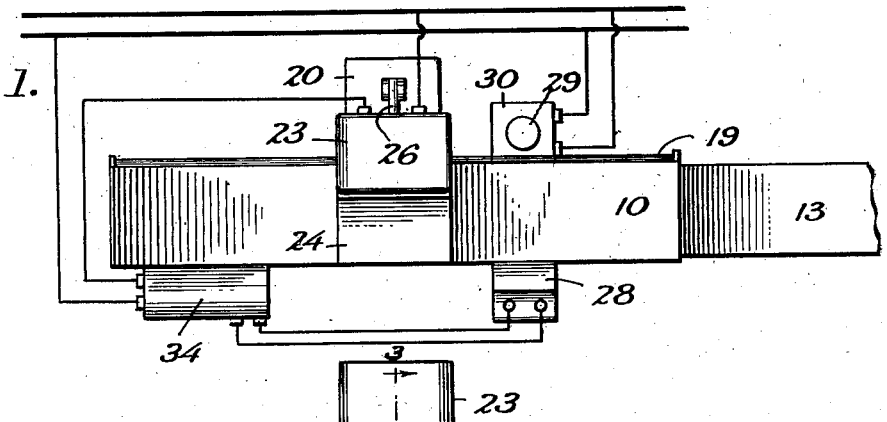
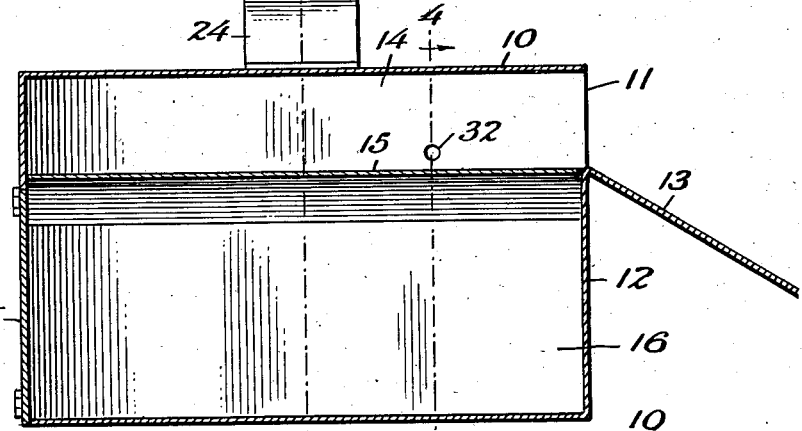
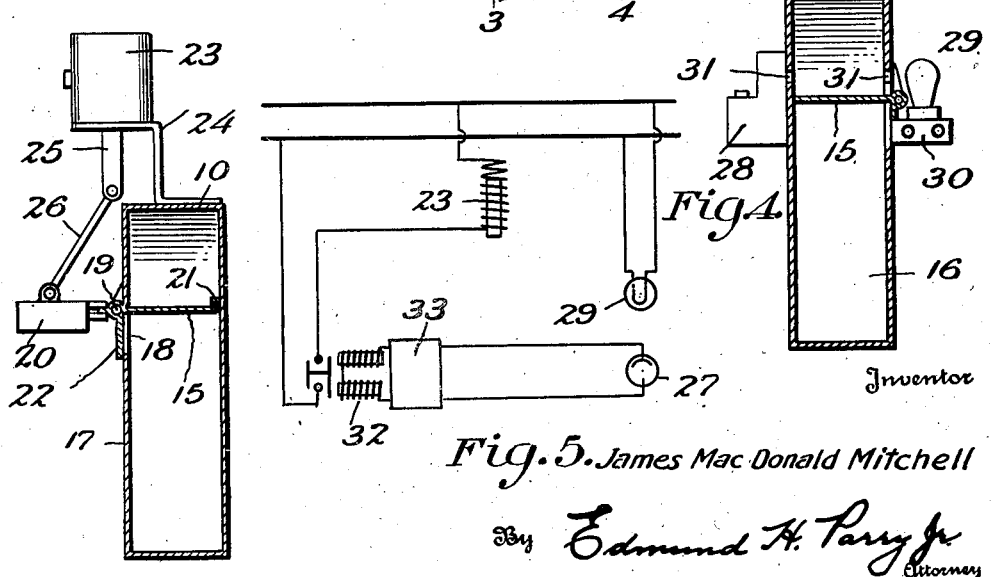
Inventor
James Mac Donald Mitchell
By Edmund H. Parry Jr.
Attorney Patented Feb. 1, 1938

2,107,080

UNITED STATES PATENT OFFICE 2,107,080

ANIMAL TRAP

James Macdonald Mitchell, Old Lyme, Conn.

Application June 4, 1935, Serial No. 24,928

14 Claims. (Cl. 43—69)

This invention relates to animal traps of the type involving an enclosure or housing in which an animal is trapped by the automatic release of a door or panel.

In known traps of the kind mentioned the closing in some cases depends upon the depression of a platform or a door operating lever mechanism by the weight of the animal and in other cases the closing of the trap depends upon disturbance of the bait employed to entice the animal into the trap. Regardless of how carefully such traps are designed and constructed there is always a possibility of failure in that the animal may enter and leave without activating the closing mechanism.

The essential object of the present invention is to overcome operating difficulties such as are present in prior traps by employing a construction so arranged that the mere physical presence of an animal in the trap will cause the trapping mechanism to operate, the weight and size of the animal and its seizure of the bait being entirely eliminated as operating factors.

A further object of the invention is to provide a trap mechanism which will be operated positively and with great rapidity when the animal enters.

Another object of the invention is to provide a trap mechanism so arranged and constructed as to be inoperative until the animal is entirely within the trap enclosure and which will respond instantaneously as soon as the animal reaches a selected point in the enclosure.

Still another object of the invention is to provide a trap mechanism which does away with trip devices, releasable latches and spring actuating mechanism, weight operated platforms and levers and other mechanical devices commonly employed in traps, all of which are likely to stick or otherwise fail under certain conditions.

A further object of the invention is to provide an improved control and operating mechanism which may be applied to existing traps of various constructions.

A still further object is to provide an electrically operated trap mechanism, and further to so construct the same as to be rendered operative by an animal without contact with any part of the operating mechanism.

As another object of the invention it is proposed to provide a trap employing light responsive control means, and further to employ a trapping mechanism which is electrically operated under control of a light sensitive device.

The invention is adapted for use in buildings or elsewhere for trapping rats, mice and other animals of various sizes and the purpose for which a particular trap is required will determine its size and mechanical design. The same actuating and control mechanism will be equally adaptable with slight variations to different traps.

In the accompanying drawing I have illustrated a preferred adaptation of the invention involving a main trap structure possessing certain novel structural features and employing one embodiment of the special control and actuating mechanism which constitutes a substantial departure from prior arrangements. In such drawing:

Fig. 1 is a top plan view of a complete trap structure and illustrating diagrammatically the electrical circuit between the various units of the control and operating mechanism;

Fig. 2 is a view in sectional elevation taken longitudinally of the trap of Fig. 1;

Fig. 3 is a transverse section taken generally on the line 3—3 of Fig. 2 illustrating particularly the operating mechanism;

Fig. 4 is another transverse section taken about line 4—4 of Fig. 2 to illustrate the light responsive control mechanism; and Fig. 5 is a circuit diagram illustrating schematically the arrangement of the various parts.

The trap illustrated includes a main casing or housing generally designated by the numeral 10, the same preferably being relatively long and narrow and having substantial depth. The animal enters through an opening 11 in the end wall 12. The entrance as will be noted is near the top of the structure and the animal gains access thereto by a ramp 13. The animal passes into an entrance chamber 14 provided with a platform or floor 15. The bait employed to entice the animal into the trap will normally be placed near the far end of chamber 14.

Below the entrance chamber 14 is a main trap chamber 16 into which the animal is plunged by collapse of the platform 15 or a trap door formed therein. In the illustrated arrangement the platform 15 is formed as a unit and provided along one side with a hinge connection to the side wall 17 of the trap structure as best shown in Fig. 3. Preferably a slot 18 is formed longitudinally of the wall 17 to provide for the full collapse of platform 15 and the hinge connection generally designated by the numeral 19 is made between the edge of the platform and the outer side of wall 17.

The platform is normally maintained in the horizontal position shown in several views by a counter-weight 20 of sufficient size to prevent depression of the platform by the weight of the animal. To prevent the counter-weight from swinging the platform upwardly beyond horizontal position, one or more stops 21 may be provided along the opposite side wall against which the free edge of the platform will bear. The longitudinal opening 18 in the side wall 17 which allows the platform to swing downwardly should of course be closed to prevent the escape of the animal after the same enters trap chamber 16. To this end the platform 15 may be provided with a down turned edge flange 22 which will close the opening 18 when the platform is in horizontal position. The flange 22 may additionally function to prevent upward movement of the platform in lieu of or in addition to the stop 21.

As previously indicated the operating mechanism is of an electrical type and includes a powerful solenoid or electromagnet 23 which may be supported by a bracket 24 on top of the trap casing 10. The armature 25 of the solenoid pivotally connects with the arm of the counterweight 20 through a connecting arm 26. When the solenoid is energized the armature 25 is instantaneously raised with sufficient electrical force to overbalance the counter-weight and the platform 15 in the trap is swung downwardly to drop the animal into the main trap chamber 16. When the magnet is de-energized upon the breaking of the electrical current thereto the counter-weight swings the platform 15 upwardly to its horizontal position, thus entrapping the animal in chamber 16.

The trap operating mechanism just described is controlled by a light responsive device which is actuated as the animal passes into the entrance chamber 14 to energize the platform operating solenoid 23. Such part of the device includes a photo-electric cell 27, diagrammatically illustrated in Fig. 5, which is housed in a casing 28 on the side of the casing 10 opposite the entrance chamber 14. Secured to the other side wall of the casing 10 is an electric light or bulb 29 supported on a platform or other mounting 30. Small aligned apertures or ports 31 are provided in the side walls of the casing 10 slightly above the platform 15. The bulb 29 will constantly be illuminated from a source of electrical supply so that a beam of light will pass across the entrance chamber 14 and impinge upon the photo-electric cell 27.

The photo-electric cell connects with an electromagnetic relay switch 32, diagrammatically indicated in Fig. 5, placed in the power circuit of the operating solenoid 23. The arrangement is such that as long as the cell receives light from the electric bulb 29 the electromagnetic switch will be energized to maintain the circuit to the solenoid 23 broken. In view of the fact that the electrical energy developed in a photo-electric cell is relatively small, it is advisable to employ an electrical amplifier or booster in the circuit between the photo-electric cell and the electromagnetic relay 32. Amplifiers of the vacuum tube type for use in connection with photo-electric cells are well known and obtainable on the market, and I have therefore merely diagrammatically indicated such an amplifier at 33. Not only does the amplifier insure more reliable operation but enables a less sensitive and less expensive electromagnetic switch 32 to be employed.

The entire wiring circuit of the illuminating bulb, photo-electric cell, amplifier, electromagnetic switch and operating solenoid is illustrated in Fig. 5 in a schematic layout. In the actual construction the electromagnetic switch and relay may be incorporated in a single housing 34, as shown in Fig. 1, which also shows the electrical circuit and the relative position of the various operating units.

It will be understood from the description given that as an animal enters the entrance chamber 14 shown in Fig. 2 it will interrupt the beam of light between the illuminating bulb 29 and the photo-electric cell 27. The electromagnetic switch 32 will immediately become de-energized to close the electrical circuit to the solenoid 23 which in turn through its operating linkage will rapidly drop the platform 15 to cause the animal to fall into the trap chamber 16. As soon as the animal falls out of line of the light beam apertures 31 the photo-electric cell will immediately respond, operating through amplifier 33 and switch 32 to break the solenoid circuit. The counter-weight 20 will then become operative to quickly return the platform 15 to its horizontal position, thus completely closing chamber 16 so that the animal can not escape.

The position of the light sensitive mechanism longitudinally of the casing will to a large extent be determined by the length of the animal intended to be trapped. In any event, as indicated in Fig. 2, the light beam apertures with the illuminating bulb and photo-electric cell will be located substantially inwardly beyond the entrance opening 11 so that the animal will not interrupt the light beam until all of its body is in the entrance chamber 14, as otherwise the platform 15 might be dropped while the animal still had a chance to escape.

The operating mechanism of the invention including the light sensitive control can of course be applied to other types of traps than the drop platform arrangement of the embodiment herein shown and is equally satisfactory in traps employing a door which is closed to seal the entrance opening. I have, however, found the type herein illustrated extremely satisfactory. The same is sufficiently compact to be transported and is so arranged as to positively prevent the escape of an animal once it has entered and actuated the operating structure. Referring again to Fig. 2, it will be evident that the arrangement is such as not readily to permit the removal of a captured animal once it has passed into the chamber 16. Accordingly, it is desirable to provide a hinged door 35 in one end of the casing 10.

It will be observed that the operating mechanism of the invention has a minimum of mechanical parts and is so constructed as to be positive in operation. The construction of the operating mechanism and the type of trap with which the same is employed may be varied to a considerable degree and I therefore do not intend to confine my invention to the particular embodiment illustrated.

I claim:

1. An animal trap comprising a trap housing, a chamber in the housing having an opening through which an animal enters the chamber, a trap door, door actuating means, and means located outside the chamber wall sensitive to the presence of the animal in the chamber to activate the door operating means.

2. An animal trap comprising a trap housing, a chamber in the housing having an opening through which the animal enters the chamber, a trap door, illuminating means transmitting a light beam across the chamber and light sensitive means spaced from and opposite to said illuminating means, said illuminating and light sensitive means being so located that the beam of light will be broken by the passage of the animal through the chamber, and means controlled by the light sensitive means operative when the light beam is broken to actuate the trap door.

3. An animal trap comprising a trap housing, a chamber in the housing having an opening through which an animal enters the chamber, a trap door, door actuating light transmitting means and light sensitive means mounted on the opposite side walls of the housing so as to have the beam of light therebetween broken by the passage of the animal through the chamber, and actuating means for the trap door responsive to the interruption of said light beam.

4. An animal trap comprising a trap housing, a trap door in said housing, and operating means controlled by the animal for actuating the door both to open and closed positions, said operating means including electrical means for positively moving the door to one position and a counterweight means for positively moving the door to its other position.

5. An animal trap comprising a trap housing, a trap door in said housing, electrical actuating means for positively opening said door, and means sensitive to the presence of an animal in the housing controlling operation of said door actuating means.

6. An animal trap comprising a trap housing, a trap door in the upper part of said housing, electromagnetic means for positively moving said door, and a sensitized mechanism located above the trap door and subject to remote control by an animal in the housing for causing operation of said electromagnetic means.

7. An animal trap comprising a trap housing, a trap door in the upper part of said housing, electrical means for actuating said door, and light sensitive means controlling operation of said door actuating means supported by the housing at a point above the trap door, said light sensitive means being responsive to the presence of an animal in the trap housing.

8. An animal trap comprising a trap housing, a chamber in the housing having an entrance opening for admitting an animal thereto, a trap door in the chamber, actuating mechanism for said door, and light sensitive means, positioned at a point outside the chamber spaced inwardly from the entrance opening and above the trap door and responsive to the presence of an animal, controlling operation of the door actuating mechanism.

9. In an animal trapping device, a trap housing, a trap door in the housing and normally lying horizontally of the housing, light beam projecting means positioned at one side of the trap door and light beam receiving means at the other side, a relay responsive to interruption of the light beam connected to the light receiving means, and operating mechanism for the trap door actuatable through the relay.

10. In an animal trapping device, a trap housing, a pivoted trap platform located interiorly of and normally lying horizontally of the housing, light beam projecting means positioned at one side of the trap platform and light beam receiving means at the other side, a relay responsive to interruption of the light beam connected to the light receiving means, and operating mechanism actuatable through the relay upon interruption of the light beam to depress the trap platform.

11. In an animal trapping device, a trap housing, a pivoted trap platform located interiorly of and normally lying horizontally of the housing, light beam projecting means positioned at one side of the trap platform and light beam receiving means at the other side, a relay responsive to interruption of the light beam connected to the light receiving means, operating mechanism actuatable through the relay upon interruption of the light beam to depress the trap platform, and a counterweight becoming operative through the renewal of the transmission of the light beam to the light receiving means to return the platform from its depressed to its horizontal position.

12. In an animal trapping device, a trap housing, a pivoted trap platform located interiorly of the housing, a counterweight normally maintaining said platform in horizontal position against the weight of an animal upon the platform, electrical actuating means for overbalancing the counterweight and depressing the platform, and light responsive means controlled by the animal for causing the electrical actuating means to depress the platform and for rendering the counterweight effective to return the platform to its horizontal position.

13. In an animal trapping device, a trap housing, an entrance chamber in the upper part of the housing having an opening for admitting an animal thereto, a main trap chamber below said entrance chamber, a pivoted trap platform between said several chambers and constituting a floor for the entrance chamber, actuating means for depressing said platform, and remote control means supported by the trap housing independently of the trap platform sensitive to and operating in response to the presence of an animal in the entrance chamber for activating the platform actuating means.

14. An animal trap comprising a housing providing a trap chamber, a trap platform at the upper side of the trap chamber, light sensitive means located above and on one side of the trap platform, illuminating means on the other side of the trap platform and transmitting a beam of light to the light sensitive means which is interrupted by an animal as it walks along the platform, and means controlled by the light sensitive means operative when the light beam is interrupted to actuate the trap platform.

JAMES MACDONALD MITCHELL.